UNITED STATES PATENT OFFICE.

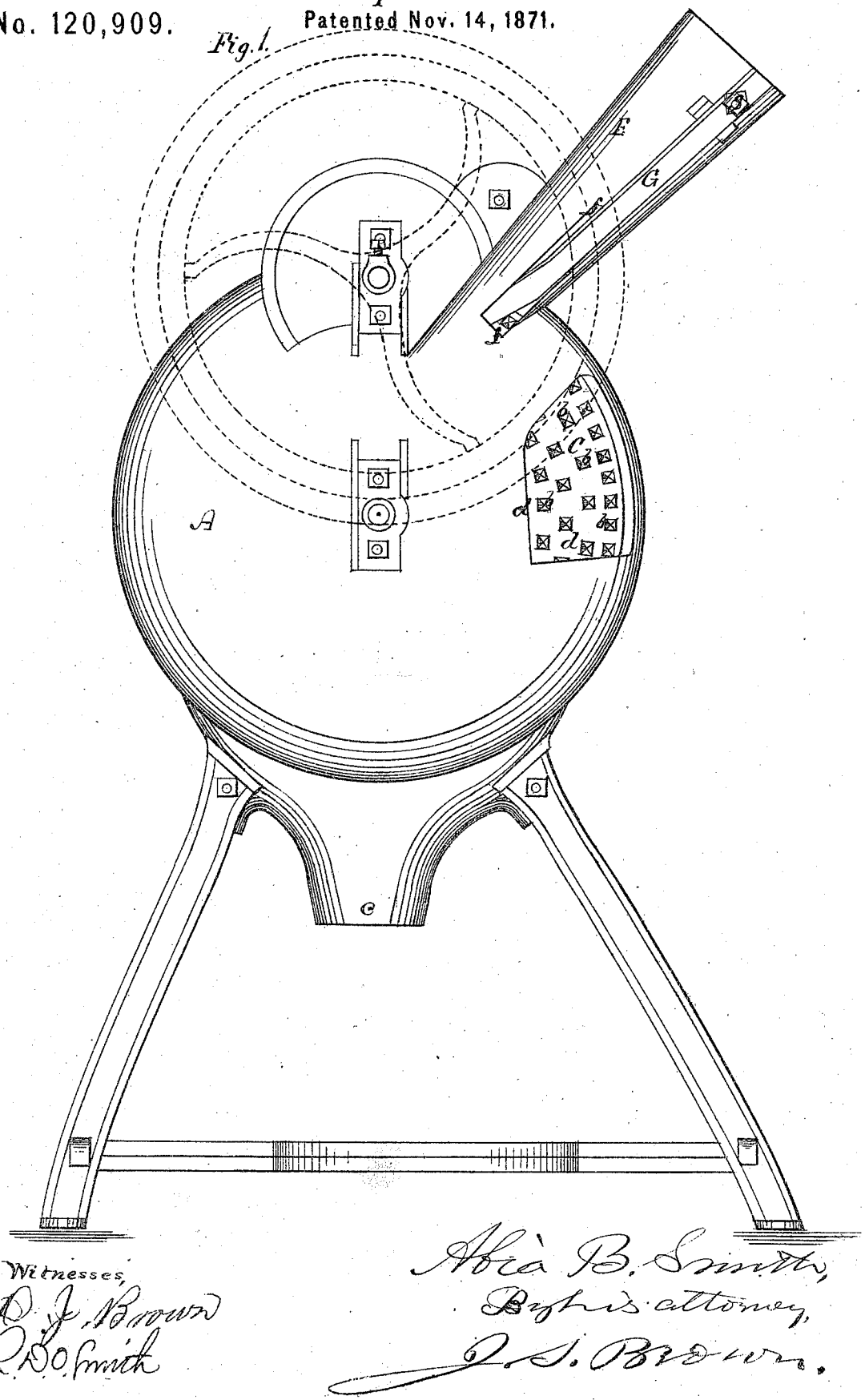

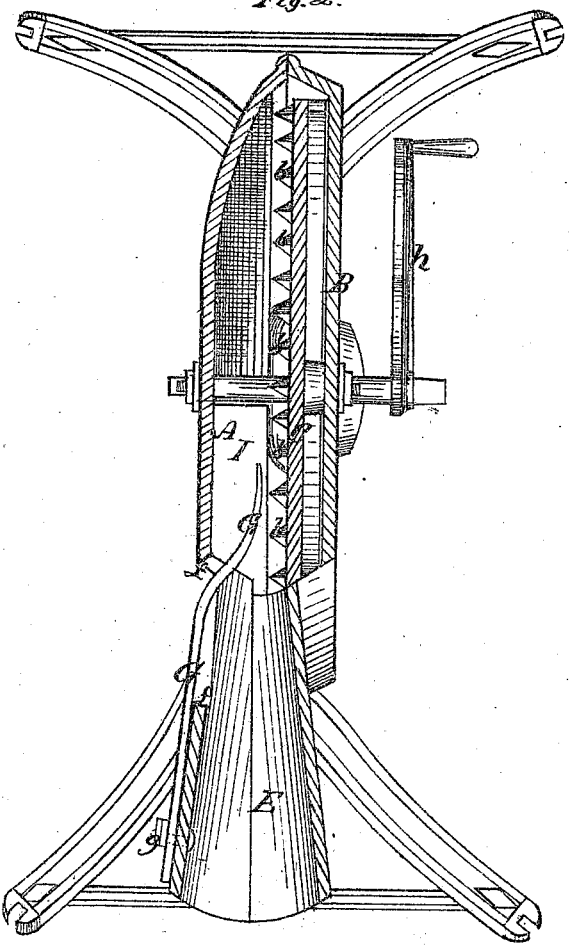

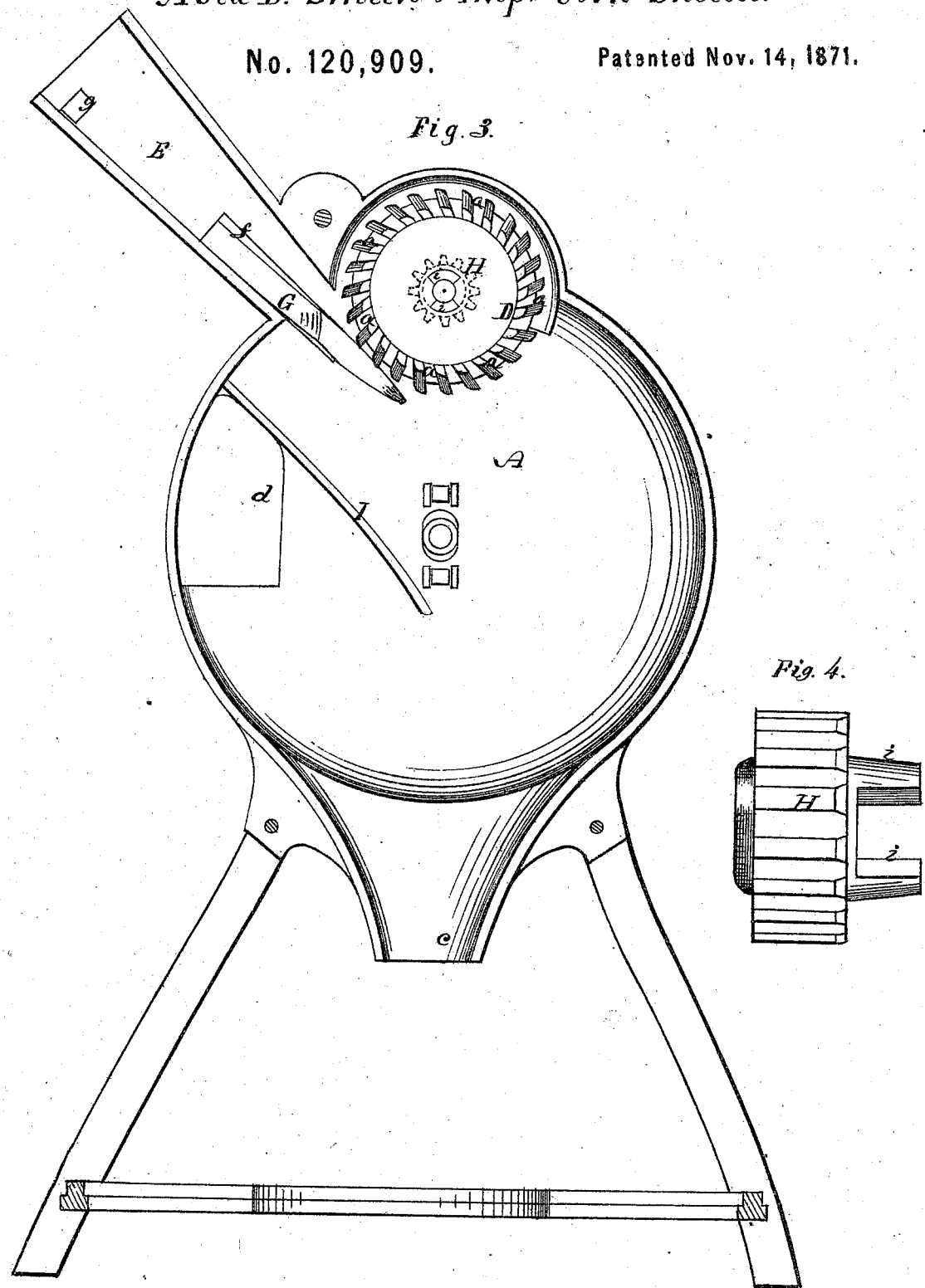

ABIA B. SMITH, OF WELLSBURG, WEST VIRGINIA.

IMPROVEMENT IN CORN-SHELLERS.

Specification forming part of Letters Patent No. 120,909, dated November 14, 1871.

*To all whom it may concern:*

Be it known that I, ABIA B. SMITH, of Wellsburg, in the county of Brooke and State of West Virginia, have invented certain Improvements in Corn-Shellers; and do hereby declare that the following is a full and exact description thereof, reference being had to the accompanying drawing making part of this specification—

Figure 1 being a left-hand side view of a corn-sheller constructed with my improvements; Fig. 2, a transverse section thereof in a plane indicated by the line $x\ x$, Fig. 1, and looking downward; Fig. 3, a view from the right-hand side of the interior of the case, the shelling-disk being removed; Fig. 4, a view of a part detached.

Like letters designate corresponding parts in all of the figures.

Let A B represent the two sides of the sheller-case inclosing a revolving shelling-disk, C, and a feeding-wheel, D. This sheller is of that kind in which the ears of corn are fed, one by one, into a narrow hopper, E, and drawn into the machine by the small revolving-wheel D with cog-like projections $a\ a$ on its periphery, and shelled by the revolving disk C, having shelling-teeth $b\ b$ on one side in connection with one side A of the inclosing case. This case is close, so that it catches all of the shelled corn and delivers it through a spout, $c$, at the bottom, and delivers all of the cobs through an opening, $d$, in the side of the case higher up than the said spout.

My invention consists in several special improvements, which I proceed to describe successively.

First, the spring G, which heretofore has been placed inside of the hopper E for holding the ears of corn close to the shelling-disk as they are drawn into the machine by the feed-wheel D, I locate outside of the hopper at its upper end, and thence extend it through a slot or oblong opening, $f$, in the side of the hopper, and terminate it within the case by the side of the shelling-disk. The arrangement is substantially as represented in the drawing. The spring is attached, by a screw-bolt, $g$, at its upper outer end, to the hopper. The advantages of this arrangement of the spring are, first, that it does not take up the room inside of the hopper, enabling the latter to be made somewhat smaller, as well as smooth, round, and unobstructed inside; second, the sides or ends of the slot or opening $f$ limit the movements of the spring, so that it is allowed to spring in closer to the shelling-disk without coming in contact with the same, thus better accommodating itself to small ears and ends of corn; and third, it allows the spring a greater range of movement, so as to adapt the machine better to small-eared northern corn and large-eared southern corn.

Second, I locate the feed-wheel D above the entrance of the hopper E in a recess of the top of the case, as shown, instead of below the hopper, as heretofore; and arrange the shelling-disk C in connection with the feed-wheel, so as to revolve the disk over and backward in the sheller-case, instead of revolving it downward and backward, as heretofore. The purposes and advantages of this arrangement are: First, that thereby I am enabled to place the driving-crank $h$ on the right-hand side of the machine, so that the operator can turn the crank with his right hand and feed the ears of corn into the hopper with his left hand while standing before the machine; whereas, with the machines of this kind as heretofore constructed, the crank being on the left-hand side and turning in the wrong direction, a single person cannot both turn the crank and feed in the ears except in an awkward, slow, and laborious manner. Second, the feed-wheel D being located vertically over the main part of the case, no grains of corn lodge around it in its recess nor obstruct its motion, always falling back by their own gravity; whereas, in the other machines, this exemption from obstruction is not secured.

Third, the small pinion H, on the shaft of the feed-wheel D, is put loose on the shaft and is coupled to the feed-wheel by a clutch-fork or projection, $i$, fitting between corresponding projections on the face of the feed-wheel. By this construction I avoid the necessity of keying the pinion to the shaft, it being so small that it cannot be keyed thereto and possess sufficient strength; and I am enabled to make the pinion of wrought-iron and have a very cheap and strong gearing; and the pinion can be removed or replaced by itself.

Fourth, I place a partition rib or plate, I, across the space between the two sides A B of the case, reaching from the periphery of the case beneath the hopper E back to or beyond the shaft of the shelling-disk. This partition-plate is represented in Fig. 3 as extending below the shaft, but it may be, and preferably, above the shaft; or there may be two plates—one above and the other below the shaft. This plate causes all of the shelled corn to be conducted first to the back part of the case and surely prevents the falling of any directly among the cobs as they rise beneath to be discharged at the aperture $d$, so that all the grain is conducted with certainty to the spout at the bottom and the discharge of the cobs is not impeded.

What I claim as my invention, and desire to secure by Letters Patent, is—

1. The arrangement of the spring G in the slot or opening $f$ of the hopper E, substantially as and for the purpose herein specified.

2. The arrangement of the feed-wheel D, hopper E, and shelling-disk C, substantially as and for the purpose herein specified.

3. In combination with the feed-wheel D, the pinion H, constructed as described, and arranged to operate substantially as and for the purpose herein specified.

4. The combination and arrangement of the partition-rib or plate I with the hopper E, shelling-disk C, spout $c$, and cob-discharge opening $d$, substantially as and for the purpose herein specified.

Specification signed by me this 8th day of February, 1871.

ABIA B. SMITH.

Witnesses:
J. G. JACOB,
J. R. LAZEAR.

(59)